US012757992B2

(12) United States Patent
Jones, Jr.

(10) Patent No.: US 12,757,992 B2
(45) Date of Patent: Oct. 13, 2026

(54) MEMORY CARD HOLDER DEVICE WITH INTEGRATED MOUNTING ASSEMBLY

(71) Applicant: Julius Michael Jones, Jr., Brooklyn, NY (US)

(72) Inventor: Julius Michael Jones, Jr., Brooklyn, NY (US)

( * ) Notice: Subject to any disclaimer, the term of this patent is extended or adjusted under 35 U.S.C. 154(b) by 0 days.

(21) Appl. No.: 18/825,074

(22) Filed: Sep. 5, 2024

(65) Prior Publication Data

US 2025/0072572 A1 Mar. 6, 2025

Related U.S. Application Data

(60) Provisional application No. 63/580,490, filed on Sep. 5, 2023.

(51) Int. Cl.

| | |
|---|---|
| ***A45C 11/18*** | (2006.01) |
| ***A45C 13/00*** | (2006.01) |
| ***A45C 13/10*** | (2006.01) |
| ***G03B 17/56*** | (2021.01) |
| ***G06K 19/00*** | (2006.01) |

(52) U.S. Cl.

CPC ............ *A45C 11/18* (2013.01); *A45C 13/002* (2013.01); *A45C 13/005* (2013.01); *A45C 13/10* (2013.01); *G03B 17/56* (2013.01); *G06K 19/005* (2013.01); *A45C 2011/188* (2013.01)

(58) Field of Classification Search

CPC ..... A45C 11/18; A45C 13/002; A45C 13/005; A45C 13/10; A45C 2011/188; G03B 17/56; G06K 19/005

USPC .......................................................... 206/307

See application file for complete search history.

(56) References Cited

U.S. PATENT DOCUMENTS

| | | | | | |
|---|---|---|---|---|---|
| 6,763,946 | B1 * | 7/2004 | Martin | H05K 9/0067 | 224/908 |
| 2002/0109982 | A1 * | 8/2002 | Lu | G06F 1/1656 | 362/253 |
| 2005/0150796 | A1 * | 7/2005 | Wong | B65D 25/10 | 206/320 |
| 2008/0272010 | A1 * | 11/2008 | Friedman | A45C 11/18 | 206/39.6 |
| 2010/0051487 | A1 * | 3/2010 | Sheba | A45C 11/18 | 206/307 |
| 2013/0062233 | A1 * | 3/2013 | Kubota | A45C 11/182 | 206/307 |
| 2023/0210232 | A1 * | 7/2023 | Kane | A45C 1/06 | 206/425 |

* cited by examiner

*Primary Examiner* — Jacob K Ackun

(57) ABSTRACT

The present invention relates to a memory card holder device comprising a body with an elongated internal track, a slidable mounting assembly within the track, and at least one compartment configured to securely retain memory cards in a slotted arrangement. The mounting assembly includes a first mounting piece with a ¼-20 screw forming a male connection point, and a second mounting piece with a threaded opening forming a female connection point. The sliding mechanism allows the mounting assembly to be adjusted along the track, enabling the alignment of the body with various camera bodies while maintaining secure attachment through the connection points. The device is designed to integrate seamlessly with camera equipment, providing a versatile and compact solution for securely storing and accessing memory cards during use.

11 Claims, 6 Drawing Sheets

MEMORY CARD HOLDER DEVICE WITH INTEGRATED MOUNTING ASSEMBLY

FIELD OF INVENTION

The present invention relates to the field of photography and electronic accessories, specifically to a device designed for securely holding and storing memory cards with an adjustable mounting assembly for attachment to cameras and related equipment.

BACKGROUND

In the field of photography, the need for efficient and reliable storage of digital data has always been paramount. As digital cameras have evolved, so too have the storage media and the associated accessories designed to support photographers in their work. Traditional methods of storing memory cards have often fallen short in meeting the demands of modern photographers, particularly in terms of accessibility, security, and ease of integration with other equipment. Despite advancements in camera technology, the challenge of managing small but essential components like SD cards remains significant.

Photographers frequently find themselves in high-pressure situations where every moment counts, such as during live events, wildlife photography, or fast-paced action shoots. In such environments, the need to quickly swap or access memory cards without disrupting the workflow is critical. Unfortunately, many existing solutions require photographers to stop what they are doing, locate a separate storage pouch or container, and manually retrieve the needed card. This process not only interrupts the shooting process but also increases the risk of losing or damaging the cards due to mishandling or misplacement.

Moreover, while many cameras offer built-in storage options, these are often insufficient for professional use, necessitating the use of additional memory cards. The compact size of SD cards, while advantageous in terms of portability, also makes them easy to misplace, especially during shoots that involve frequent card changes. Current storage solutions, such as card wallets or small plastic cases, are often kept separately from the camera, leading to additional handling time and the possibility of losing track of the cards altogether. This disconnect between storage and the camera itself has long been a pain point for photographers who require a more integrated and secure solution.

Furthermore, the use of tripods and other mounting equipment is ubiquitous in photography. However, the attachment of multiple accessories to a camera can be cumbersome, often leading to a cluttered setup that hampers mobility and ease of use. Standard SD card holders do not offer a way to integrate seamlessly with these mounting systems, forcing photographers to either compromise on accessibility or sacrifice valuable equipment mounting options. This issue is compounded when photographers are required to carry additional gear to manage their storage needs, further complicating their setup and potentially leading to missed opportunities during a shoot.

In addition, while some attempts have been made to create more integrated storage solutions, these often involve custom or proprietary systems that do not offer the flexibility needed by photographers who use a variety of cameras and accessories. The lack of a universal solution that can be adapted to different setups and preferences has left a significant gap in the market. Photographers are often forced to choose between accessibility and the ability to customize their equipment layout, a choice that can negatively impact their efficiency and overall shooting experience.

Finally, the rapid pace of technological advancement in the field of digital photography means that storage solutions must also evolve to accommodate new types of memory cards and storage devices. Current solutions are often limited to a specific type of card or connection, leaving photographers with outdated equipment as new standards emerge. The need for a versatile and future-proof solution that can accommodate various types of storage media while maintaining compatibility with existing equipment is increasingly apparent.

It is within this context that the present invention is provided.

SUMMARY

The present invention relates to a memory card holder device that comprises a body with an elongated internal track, within which a mounting assembly is slidably secured. The mounting assembly includes a first mounting piece with a ¼-20 screw forming a male connection point and a second mounting piece with a threaded opening forming a female connection point. The mounting assembly's ability to slide along the internal track allows for the adjustment of the position of the body relative to the mounting assembly, enabling alignment with various camera bodies while maintaining secure attachment through both the male and female connection points. Additionally, the body of the memory card holder device includes at least one compartment designed to securely retain memory cards in a slotted arrangement.

This invention provides a compact and versatile solution for photographers and other users who require a reliable and accessible means of storing memory cards directly attached to their equipment. The sliding mounting assembly allows for precise alignment with different camera setups, while the secure storage compartments prevent the loss or damage of memory cards during transport or use.

In some embodiments, the body of the memory card holder device comprises a first compartment on the first side and a second compartment on the second side, allowing for the storage of multiple memory cards on either side of the device. This configuration increases the storage capacity and accessibility of the device.

In further embodiments, the memory card holder device includes a hinged door coupled to the body, which provides convenient access to the compartment while keeping the memory cards securely stored when the door is closed. This feature helps protect the memory cards from environmental factors and accidental loss.

In yet further embodiments, the elongated internal track is designed to allow the mounting assembly to slide along the longitudinal axis of the body. This sliding capability permits the adjustment of the device's position relative to the camera body, ensuring that the holder can be properly aligned with various equipment setups.

In additional embodiments, the first and second mounting pieces of the mounting assembly are coupled together using a plurality of fasteners, ensuring a robust and secure connection that can withstand regular use in various conditions.

In some embodiments, the second mounting piece is designed with rounded edges, and the internal track is shaped to correspond with these edges, allowing for smooth sliding movement and minimizing friction within the track.

In further embodiments, the memory card holder device includes a spring-loaded mechanism within the compartment, which assists in the ejection of memory cards from the slotted arrangement. This feature facilitates quick and easy access to the memory cards during use.

In yet further embodiments, the device features a locking mechanism that secures the position of the mounting assembly within the internal track after it has been adjusted. This locking mechanism ensures that the device remains in the desired position during use.

In some embodiments, the memory card holder device is specifically designed to accommodate SD cards within its compartments, providing a tailored solution for securely storing this type of memory card.

In further embodiments, the body of the memory card holder device is constructed from materials such as plastic, metal, or a combination thereof, offering durability and strength while maintaining a lightweight and portable form factor.

In yet further embodiments, the device includes a protective cover that can be removably attached to the exterior surface of the body. This cover provides an additional layer of protection against environmental factors such as dust and moisture, ensuring the safety and longevity of the stored memory cards.

BRIEF DESCRIPTION OF THE DRAWINGS

Various embodiments of the invention are disclosed in the following detailed description and accompanying drawings.

Figure 1A:
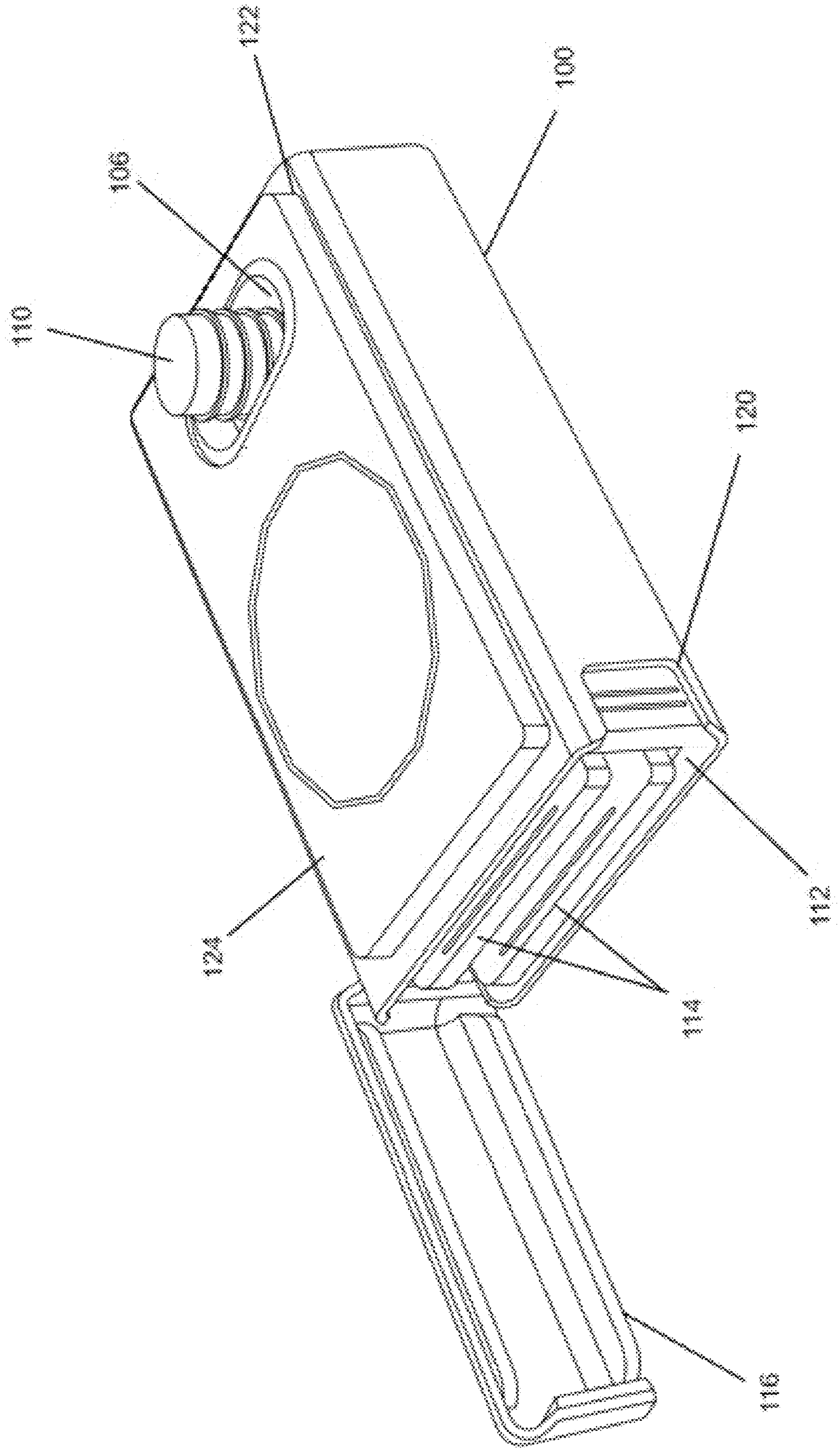
FIG. 1A illustrates an example of the single-sided memory card holder device with the hinged door in the open position.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term “and/or” includes any combinations of one or more of the associated listed items.

As used herein, the singular forms “a,” “an,” and “the” are intended to include the plural forms as well as the singular forms, unless the context clearly indicates otherwise.

It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof.

When a feature or element is described as being “on” or “directly on” another feature or element, there may or may not be intervening features or elements present. Similarly, when a feature or element is described as being “connected,” “attached,” or “coupled” to another feature or element, there may or may not be intervening features or elements present. The features and elements described with respect to one embodiment can be applied to other embodiments.

The use of spatial terms, such as “under,” “below,” “lower,” “over,” “upper,” etc., is used for ease of explanation to describe the relationship between elements when the apparatus is in its proper orientation.

The terms “first,” “second,” and the like are used to distinguish different elements or features, but these elements or features should not be limited by these terms. A first element or feature described can be referred to as a second element or feature and vice versa without departing from the teachings of the present disclosure.

The term “memory card” refers to any removable storage device capable of storing digital data, which can be inserted and removed from electronic devices such as cameras, computers, and smartphones. This includes, but is not limited to, Secure Digital (SD) cards, CompactFlash (CF) cards, microSD cards, and other types of solid-state memory cards. In one example implementation, the memory card may be an SD card used in digital cameras to store high-resolution images and videos.

The term “mounting assembly” refers to a collection of components within the memory card holder device that facilitates the attachment of the device to other equipment, such as cameras or tripods. The mounting assembly includes a first mounting piece, which holds a ¼-20 screw, and a second mounting piece with a threaded opening for receiving a ¼-20 screw from other accessories. In one example implementation, the mounting assembly may be constructed from a durable metal alloy, ensuring secure and stable attachment to a variety of camera equipment.

The term “slidable” or “sliding mechanism” refers to the capability of the mounting assembly to move along the elongated internal track within the body of the memory card holder device. This movement allows for the adjustment of the device’s position relative to the camera body or other connected equipment, providing flexibility in alignment. In one example implementation, the sliding mechanism may utilize low-friction materials such as PTFE (polytetrafluoroethylene) to facilitate smooth movement along the track.

The term "compartment" refers to any enclosed space within the body of the memory card holder device that is specifically designed to hold and secure memory cards. The compartment may include slotted arrangements that prevent the memory cards from shifting during movement. In one example implementation, the compartment may be constructed from a shock-resistant plastic to protect the memory cards from physical damage.

The term "hinged door" refers to a movable cover attached to the body of the memory card holder device, allowing access to the compartment where memory cards are stored. The hinged door may include grooves or tracks that guide its movement, ensuring a secure closure. In one example implementation, the hinged door may be made from a lightweight yet durable polymer, such as polycarbonate, and may include a snap-fit mechanism to ensure it remains closed during transport.

The term "protective cover" refers to an additional layer or shield that can be attached to the exterior surface of the memory card holder device to protect it from environmental factors such as dust, moisture, and impact. In one example implementation, the protective cover may be made from a weather-resistant material, such as silicone rubber, and may be designed to fit snugly over the entire device while still allowing access to the mounting assembly and compartments.

The invention may also incorporate various example materials depending on the intended use and environment. The body of the memory card holder device may be made from injection-molded plastic for lightweight applications or from anodized aluminum for enhanced durability. Fasteners used in the mounting assembly may be stainless steel to prevent corrosion, particularly in outdoor or humid environments. The sliding mechanism may employ precision-engineered rails or guides to ensure smooth and consistent movement, reducing wear and tear over time.

DESCRIPTION OF DRAWINGS

The present invention pertains to a memory card holder device designed to address the various shortcomings and limitations of prior art storage solutions used in conjunction with cameras and other electronic devices. Traditional memory card holders often fail to provide a secure, easily accessible, and integrated solution for photographers who require rapid and reliable access to memory cards during shooting sessions. These conventional holders typically require the user to store memory cards separately from their equipment, resulting in delays during critical moments and an increased risk of loss or damage to the memory cards.

This invention overcomes these deficiencies by offering a compact, versatile, and adjustable memory card holder that integrates seamlessly with a camera setup. The device is equipped with a sliding mounting assembly that allows it to be securely attached between a camera and a tripod or other accessory while maintaining a compact profile that aligns with the camera body. This integration ensures that memory cards are always within reach, without the need for additional storage pouches or containers, thereby minimizing the risk of misplacement and enhancing the overall efficiency of the photographer.

The invention further includes compartments specifically designed to securely retain memory cards, such as SD cards, in a slotted arrangement, ensuring they remain protected and readily accessible. The optional inclusion of a hinged door enhances the security of the stored cards, shielding them from external elements while still allowing for quick and easy access when needed.

One of the key advantages of this invention is the sliding mechanism within the elongated internal track, which permits the mounting assembly to be adjusted along the length of the device. This feature allows the memory card holder to be aligned with the bodies of various cameras, providing a flexible and customizable solution that can accommodate different setups without sacrificing stability or accessibility.

Figure 1B:
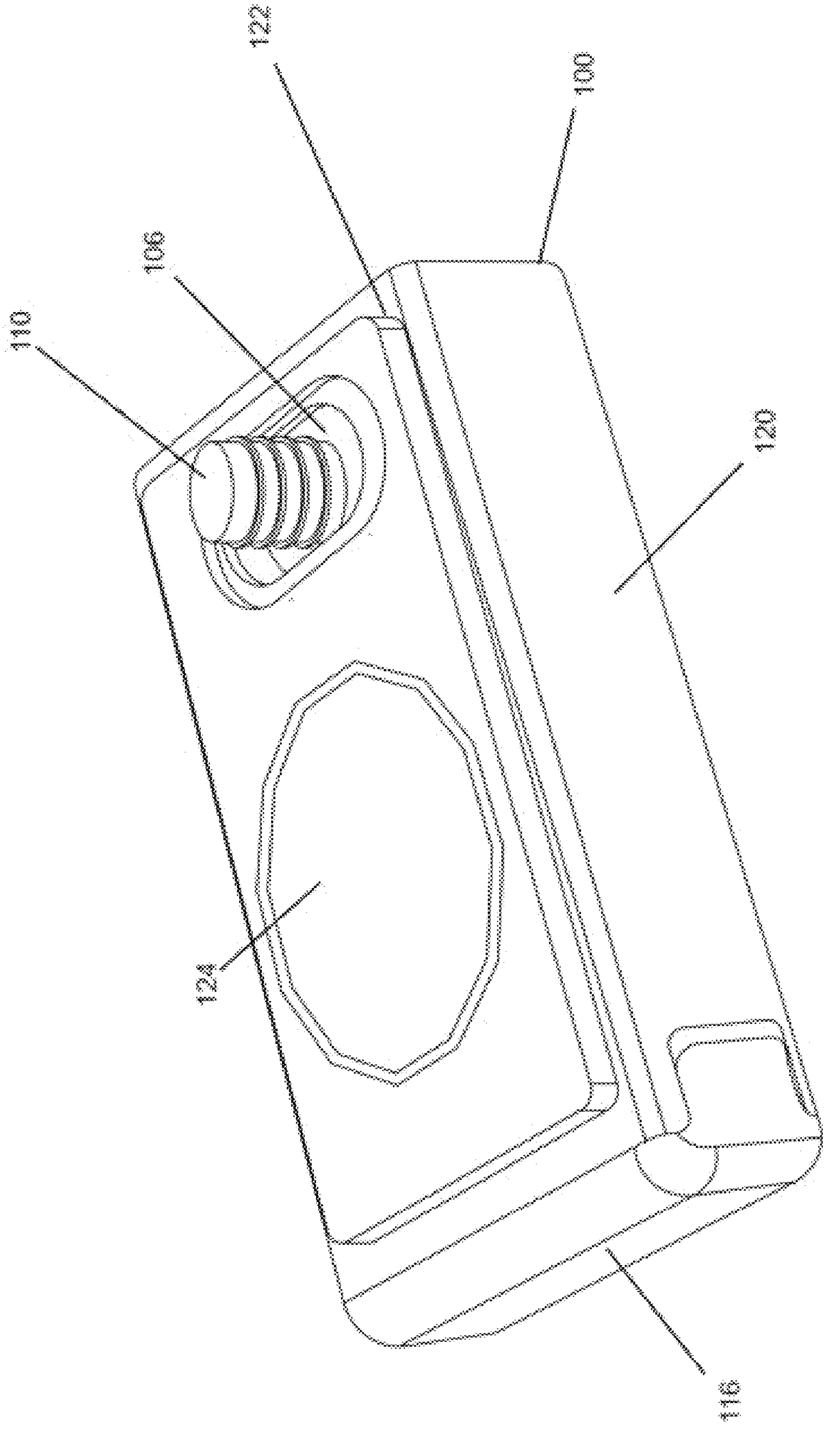
FIG. 1B illustrates an example of the single-sided memory card holder device with the hinged door in the closed position.

Referring now to the drawings, FIG. 1A and FIG. 1B illustrate the single-sided memory card holder device in its fully assembled state, providing a view of the exterior details of the device. These figures present a general overview of the device, emphasizing its compact design and the accessible elements that contribute to its functionality.

In FIG. 1A, the device is shown with the hinged door 116 in an open position, revealing the accessible memory card slots 112, which have memory cards 114 inserted therein. The memory card slots are visible at the front of the device, allowing for easy insertion and removal of memory cards. The hinged door 116 is attached to the outer casing 120 and is designed to swing open smoothly, providing direct access to the memory card slots. The outer casing 120 also features a recess 122 that houses the label/grip element 124, which is flush with the surface of the casing and provides a tactile grip or identification area. The top side of the device shows the first mounting piece 106, with the ¼-20 screw 110 projecting upwards, forming the male connection point for attachment to a camera or other equipment. The overall form factor is sleek and compact, allowing the device to integrate seamlessly with various camera setups.

In FIG. 1B, the device is shown with the hinged door 116 in a closed position, concealing the memory card slots 112 within the body 100. The closed door 116 aligns flush with the outer casing 120, maintaining the streamlined appearance of the device and protecting the memory cards from environmental factors.

Figure 1C:
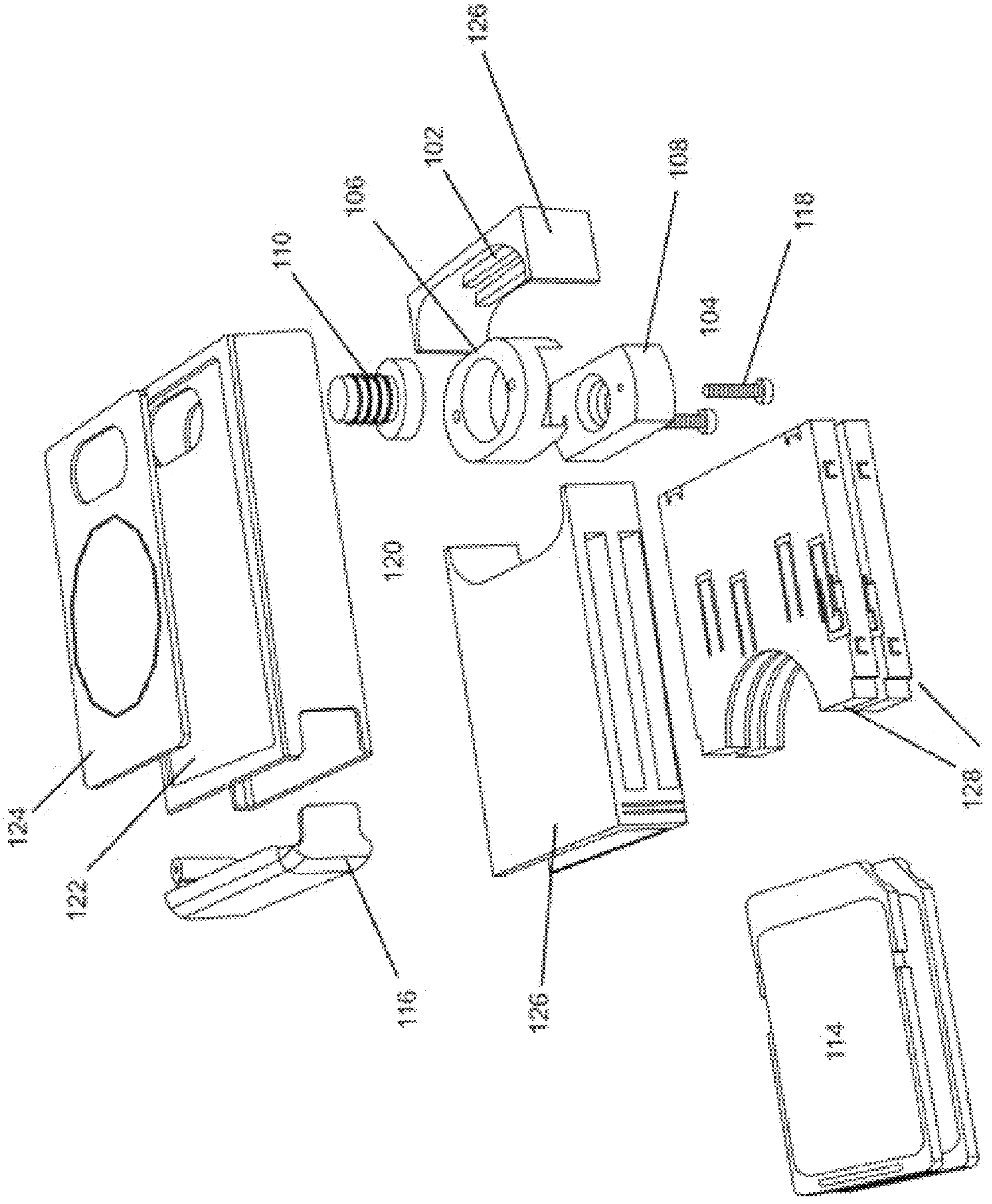
FIG. 1C illustrates an example of the single-sided memory card holder device in an exploded view, showing the internal components and assembly.

FIG. 1C illustrates an exploded view of the single-sided memory card holder device, detailing the various components and their interrelationships. The body 100 of the device is formed from several distinct pieces.

Within the outer casing 120 lies the inner casing 126, which forms the primary enclosure for both the memory card trays 128 and the mounting assembly track 102. The inner casing 126 is specifically designed to securely house these internal components, ensuring that both the memory cards and the mounting assembly are held in place during operation. The elongated internal track 102 within the inner casing 126 guides the movement of the mounting assembly 104, allowing it to slide along the length of the body 100. This sliding mechanism permits the alignment of the memory card holder device with various camera bodies, providing flexibility in its application.

The memory card trays 128 are located within the inner casing 126 and are configured to hold a plurality of memory cards 114 in a slotted arrangement. These trays 128 are designed to fit securely into the inner casing 126, ensuring that the memory cards 114 are stable and protected from displacement. The trays 128 are removable and may be adapted to accommodate different types of memory cards depending on the specific use case. In the example shown, the trays 128 are designed for SD cards, but other memory card formats could be supported with alternative tray designs.

The mounting assembly 104, housed within the inner casing 126, comprises several key components: the first mounting piece 106, the second mounting piece 108, and a ¼-20 screw 110. The first mounting piece 106 includes an opening through which the ¼-20 screw 110 extends, forming a male connection point that projects externally from the first side of the body 100. This mounting piece 106 securely holds the ¼-20 screw 110, ensuring stable attachment to external equipment such as cameras or tripods.

The second mounting piece 108 is designed to couple with the first mounting piece 106, sandwiching the ¼-20 screw 110 within the mounting assembly 104. This piece features a threaded opening, forming the female connection point on the underside of the body 100, enabling attachment to additional camera accessories beneath the memory card holder. The rounded edges of the second mounting piece 108 align with the shape of the internal track 102, allowing for smooth sliding motion along the track.

The assembly of these components is secured by screws 118, which fasten the first mounting piece 106 to the second mounting piece 108. These screws 118 ensure that the mounting assembly 104 remains robust and stable, providing a durable connection capable of withstanding regular use in various conditions.

The hinged door 116, attached to the outer casing 120, provides access to the memory card trays 128. When closed, the door 116 protects the memory cards 114 from environmental factors and accidental loss while still allowing for quick access when necessary. The door 116 operates smoothly, guided by grooves or tracks that ensure it aligns properly with the body 100 when closed.

In addition to these components, the device may also include optional features not explicitly shown in FIG. 1C but relevant to the overall design. For example, a spring-loaded mechanism could be incorporated within the memory card trays 128 to assist in the ejection of memory cards, facilitating quicker access. The materials used in the construction of the body 100, such as plastic, metal, or a combination thereof, can be selected based on the desired balance between durability and weight. Furthermore, the mounting assembly's sliding mechanism can include precision-engineered guides to ensure smooth and consistent movement, reducing wear over time.

Figure 2A:
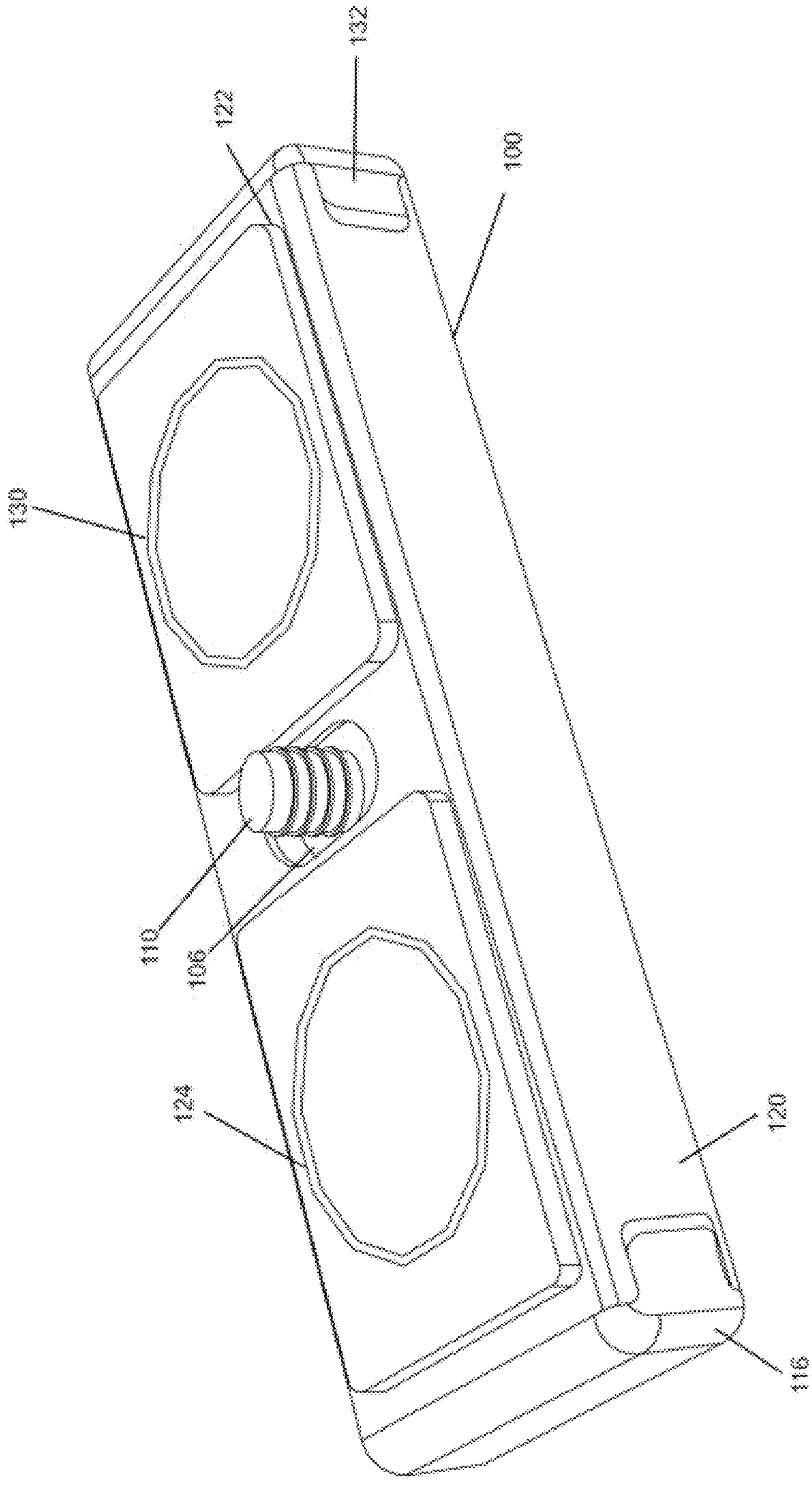
FIG. 2A illustrates an example of the double-sided memory card holder device with both hinged doors in the closed position.
Figure 2B:
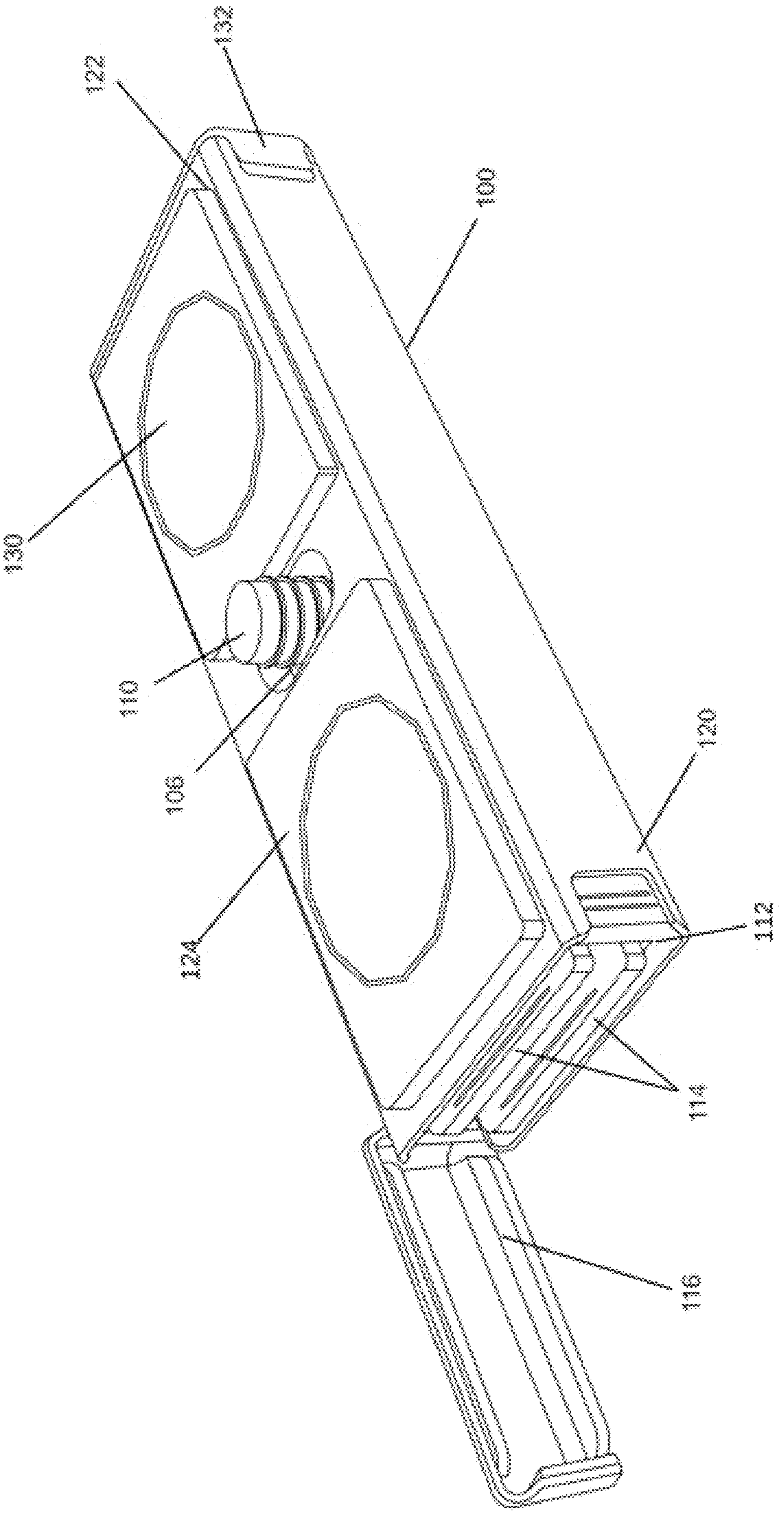
FIG. 2B illustrates an example of the double-sided memory card holder device with one of the hinged doors in the open position.

FIG. 2A and FIG. 2B illustrate the double-sided version of the memory card holder device in its fully assembled state, highlighting the external features and configuration of the device.

In FIG. 2A, the device is shown with both hinged doors 116 and 132 in the closed position, concealing the memory card slots 112 within the body 100. The device features an elongated outer casing 120 that houses the internal components and provides structural support. The outer casing 120 accommodates two label/grip elements 124 and 130, each recessed into the casing on opposite sides of the device, allowing for easy identification or enhanced grip. The top of the device displays the first mounting piece 106, with the ¼-20 screw 110 extending upward, forming the male connection point. The overall design of the device remains sleek and compact, despite the additional storage capacity provided by the double-sided configuration.

FIG. 2B shows the device with one of the hinged doors 132 in the open position, revealing the accessible memory card slots 112 within the corresponding side of the body 100. The memory card slots 112 are arranged to securely hold the memory cards, ensuring easy access while preventing accidental loss. The first hinged door 116 remains closed in this figure, demonstrating the device's ability to protect the memory cards on one side while allowing access on the other. The outer casing 120 continues to provide a robust and durable structure, with the second label/grip element 130 positioned in a recess similar to the first label/grip element 124, offering symmetrical functionality and aesthetic balance.

Figure 2C:
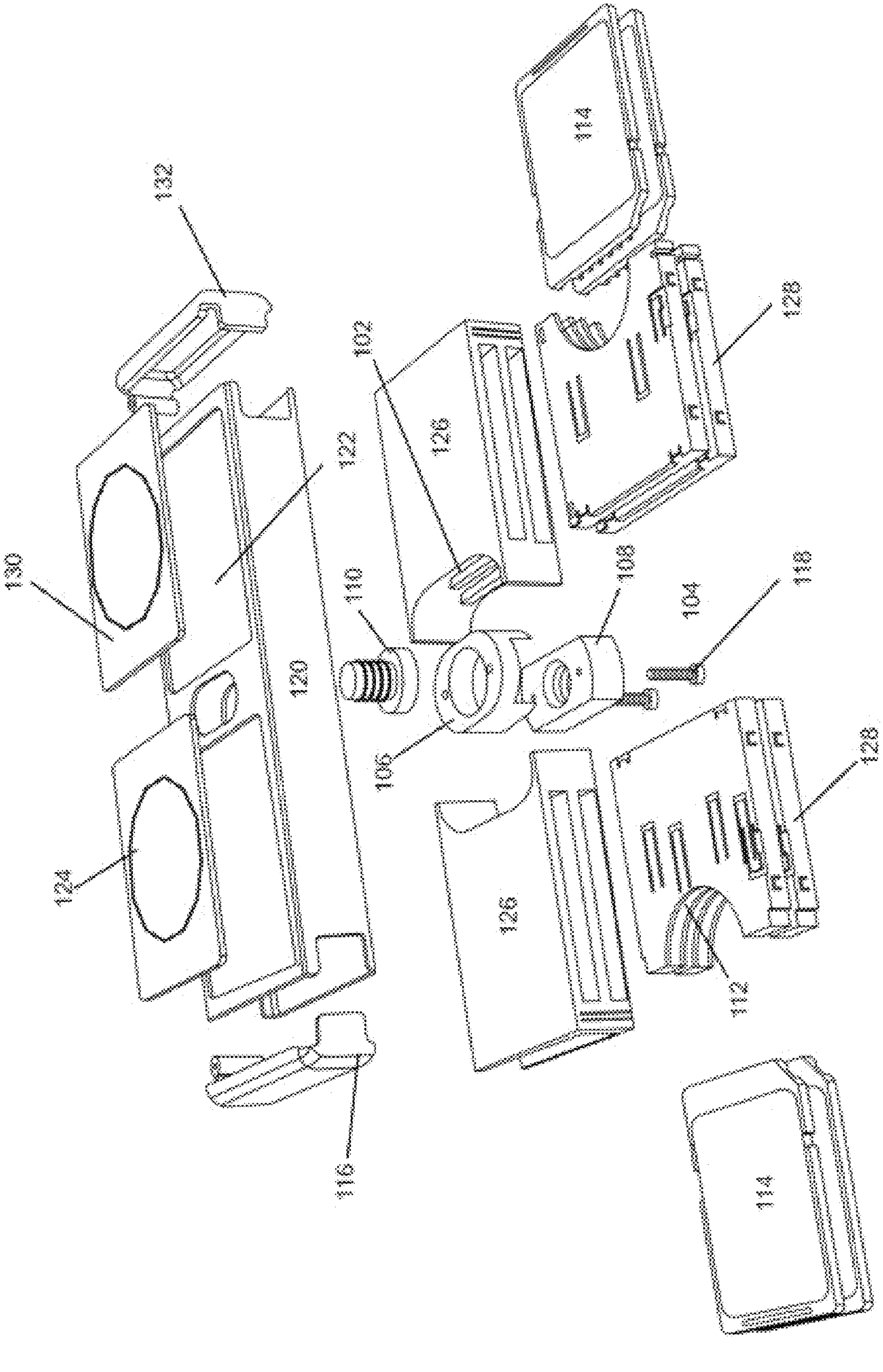
FIG. 2C illustrates an example of the double-sided memory card holder device in an exploded view, showing the internal components and assembly.

FIG. 2C illustrates an exploded view of the double-sided version of the memory card holder device. This figure builds on the elements described in FIG. 1C, with additional components introduced to accommodate the double-sided configuration.

As with the single-sided version, the device includes an outer casing 120, which houses the internal components and provides structural support. The outer casing 120 in this version is elongated to accommodate two sets of compartments and trays, one on each side of the device. Each side of the outer casing 120 includes a hinged door, with the first hinged door 116 and the second hinged door 132, allowing access to the memory card slots 112 on both sides of the device.

The inner casing 126 is similarly extended to form two internal compartments, each designed to securely hold memory card trays 128. These trays 128 are positioned within the inner casing 126 and are configured to hold a plurality of memory cards 114 in a slotted arrangement, just as in the single-sided version. However, in the double-sided version, there are two sets of memory card trays 128, one for each side of the device, effectively doubling the storage capacity.

The mounting assembly 104 remains consistent with the single-sided version, comprising the first mounting piece 106, the second mounting piece 108, and the ¼-20 screw 110. This assembly is secured within the inner casing 126, which now spans the entire length of the elongated outer casing 120. The mounting assembly 104 is still designed to slide within the internal track 102, allowing for adjustable alignment of the device with various camera bodies.

Newly added to the double-sided version are the second label/grip element 130 and the second hinged door 132, which mirror the first label/grip element 124 and the first hinged door 116 on the opposite side. These additions provide symmetrical functionality, ensuring that both sides of the device are easily accessible and that the memory cards are securely protected on both sides.

The screws 118 continue to serve their purpose in fastening the first mounting piece 106 to the second mounting piece 108, securing the ¼-20 screw 110 within the mounting assembly 104. The overall assembly of the double-sided version follows the same principles as the single-sided version, with the added benefit of increased storage capacity and accessibility due to the doubled compartments and trays.

CONCLUSION

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the memory card holder device of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A memory card holder device comprising:

a body defining an elongated internal track extending along a longitudinal axis of the body;

a mounting assembly slidably secured within the elongated internal track, the mounting assembly comprising:

a first mounting piece having an opening therethrough and a ¼-20 screw extending through said opening, wherein the ¼-20 screw forms a male connection point extending externally from the first side of the body;

a second mounting piece coupled to the first mounting piece, the second mounting piece having a threaded opening therethrough configured to receive a ¼-20 screw, thereby forming a female connection point on a the second side of the body opposite the first side;

at least one compartment defined within the body and accessible via a hinged door, the compartment configured to securely retain a plurality of memory cards in a slotted arrangement;

wherein the mounting assembly is movable along the elongated internal track, thereby allowing the relative position of the body with respect to the male and female connection points to be adjusted.

2. The memory card holder device of claim 1, wherein the body comprises a first compartment accessible from a first face of the body and a second compartment accessible from a second face of the body opposite the first face, each compartment configured to securely retain a plurality of memory cards in a slotted arrangement.

3. The memory card holder device of claim 1, further comprising a hinged door coupled to the body, wherein the hinged door is configured to open and close to provide access to the at least one compartment.

4. The memory card holder device of claim 3, wherein the hinged door is positioned on a side of the body and the at least one compartment is configured to retain a plurality of memory cards in a slotted arrangement within said side of the body.

5. The memory card holder device of claim 1, wherein the elongated internal track is configured to allow the mounting assembly to slide along the longitudinal axis of the body, thereby enabling alignment of the body with the mounting assembly.

6. The memory card holder device of claim 1, wherein the first mounting piece and the second mounting piece are coupled together by a plurality of fasteners.

7. The memory card holder device of claim 1, wherein the second mounting piece comprises an exterior surface with rounded edges, and the elongated internal track is shaped to correspond to the rounded edges of the second mounting piece.

8. The memory card holder device of claim 2, further comprising a first hinged door on the first face of the body and a second hinged door on the second face of the body, each door configured to open and close to provide access to the respective compartments on the first and second faces of the body.

9. The memory card holder device of claim 1, wherein the body is configured to align with the body of a camera to which the memory card holder device is attached, the alignment being adjustable by the sliding movement of the mounting assembly along the elongated internal track.

10. The memory card holder device of claim 1, wherein the at least one compartment is specifically shaped to accommodate the dimensions of SD cards.

11. The memory card holder device of claim 1, wherein the body is constructed from a material selected from the group consisting of plastic, metal, or a combination thereof.

* * * * *